US007565999B1

(12) United States Patent
Jensen

(10) Patent No.: US 7,565,999 B1
(45) Date of Patent: Jul. 28, 2009

(54) DISPLAY AND DISPENSING DEVICE WITH A SECURITY SHIELD

(75) Inventor: Craig A. Jensen, Van Meter, IA (US)

(73) Assignee: Owner Revolutions Inc., Adair, IA (US)

( * ) Notice: Subject to any disclaimer, the term of this patent is extended or adjusted under 35 U.S.C. 154(b) by 228 days.

(21) Appl. No.: 11/895,157

(22) Filed: Aug. 23, 2007

(51) Int. Cl.
*B65G 11/04* (2006.01)

(52) U.S. Cl. ......................... 232/44; 232/1 D; 220/210; 220/254.6; 70/159; 221/154

(58) Field of Classification Search .................. 232/44, 232/1 D, 45, 17; 206/390, 409; 70/63, 159; 221/151–152, 154; 220/210, 254.6, 259.2, 220/324, 822, 826
See application file for complete search history.

(56) References Cited

U.S. PATENT DOCUMENTS 5,100,038 A * 3/1992 Schafer ...................... 225/32
5,287,980 A * 2/1994 Saltz ......................... 220/4.27
5,399,005 A * 3/1995 Schafer ...................... 312/107
5,492,398 A * 2/1996 Schafer ..................... 312/34.7
5,606,883 A * 3/1997 Svec ........................... 70/370
5,873,481 A * 2/1999 Gruhn et al. ................ 220/210
6,095,624 A * 8/2000 Wilbert ..................... 312/34.7
7,014,065 B2 * 3/2006 Jensen ........................ 221/310
2006/0016826 A1 * 1/2006 Jensen ........................ 221/199

* cited by examiner

*Primary Examiner*—William L. Miller
(74) *Attorney, Agent, or Firm*—G. Brian Pingel; Camille L. Urban

(57) ABSTRACT

A display and dispensing device for lottery-type tickets or the like that is securable to prevent the dispensing of the tickets when desired. The device includes a housing of box-like configuration having an open rear end, a door pivotally attached to the housing open end and a security shield pivotally attached to the door and being alternatively located in an open condition allowing said lottery tickets to be dispensed and a closed condition blocking the dispensing of said tickets.

10 Claims, 11 Drawing Sheets

DISPLAY AND DISPENSING DEVICE WITH A SECURITY SHIELD

BACKGROUND OF THE INVENTION

1. Field of the Invention

The present invention relates in general to a structure for the display and dispensing of tickets, such as lottery tickets. More particularly, this invention relates to a ticket dispensing device having a door that includes a slot through which the tickets are dispensed and a security shield associated with the door to prevent the dispensing of tickets when desired.

2. Description of the Prior Art

The use of box-like structures for displaying and dispensing of lottery tickets has been known for several decades. Generally, such dispensers have common characteristics such as transparent walls through which a stack of lottery tickets may be seen, a pivotally movable door that can be locked and having a slotted portion through which the tickets may be manually dispensed.

Although the use of the above described dispensers provides a relatively secure means for the dispensing of lottery tickets so long as the dispenser is within view of an attendant, such as a sales clerk, at a point of sale in a convenience store. However, if the attendant has to leave the point of sale for any reason so that the dispenser is left unattended, it is easily possible for customers to steal the lottery tickets from a dispenser by pulling the tickets through the dispensing slot.

At the current time, there is no commercially available lottery ticket dispenser that has a simple but yet efficient method for covering the dispensing slot of a dispenser to prevent unauthorized ticket dispensing therethrough. The present invention is designed to overcome this deficiency of current lottery ticket dispensers and does so in a relatively economical and simplistic fashion.

SUMMARY OF THE INVENTION

The present invention provides a display and dispensing device for lottery-type tickets. The device generally comprises a housing having an open rear end and a door pivotally attached to the housing for closing the open end and having a slot for the dispensing of tickets from the dispenser. Associated with the door is a security shield that is pivotally attached thereto and being alternately located in an open condition allowing the lottery tickets to be dispensed through the dispensing slot and a closed condition blocking the dispensing slot to prevent the dispensing of tickets therethrough.

The dispensing device further includes a lock assembly having a body portion attached to the door and a latch member for engaging a portion of the housing to fix the door shut when said assembly is in a locked condition and securement means associated with said lock assembly latch member to maintain the security shield in the closed condition when the lock assembly is in the locked condition.

In a preferred embodiment, the door includes at least one aperture adjacent said lock assembly body portion and said security shield has a prong that extends through the aperture when said shield is in a closed condition. Additionally, said securement means includes a retaining member for engaging the prong to secure the shield in the closed condition. The retaining member is associated with the lock assembly latch member whereby said retaining member is moved into and out of engagement with the shield prong to alternately secure or release said securement means.

The foregoing and other advantages of the present invention will appear from the following description. In the description, reference is made to the accompanying drawings, which form a part hereof, and in which there is shown by illustration and not of limitation a specific form in which the invention may be embodied. Such embodiment does not represent the full scope of the invention, but rather the invention may be employed in a variety of other embodiments and references made to the claims herein for interpreting the breadth of the invention.

DETAILED DESCRIPTION OF THE PREFERRED EMBODIMENT

Figure 1:
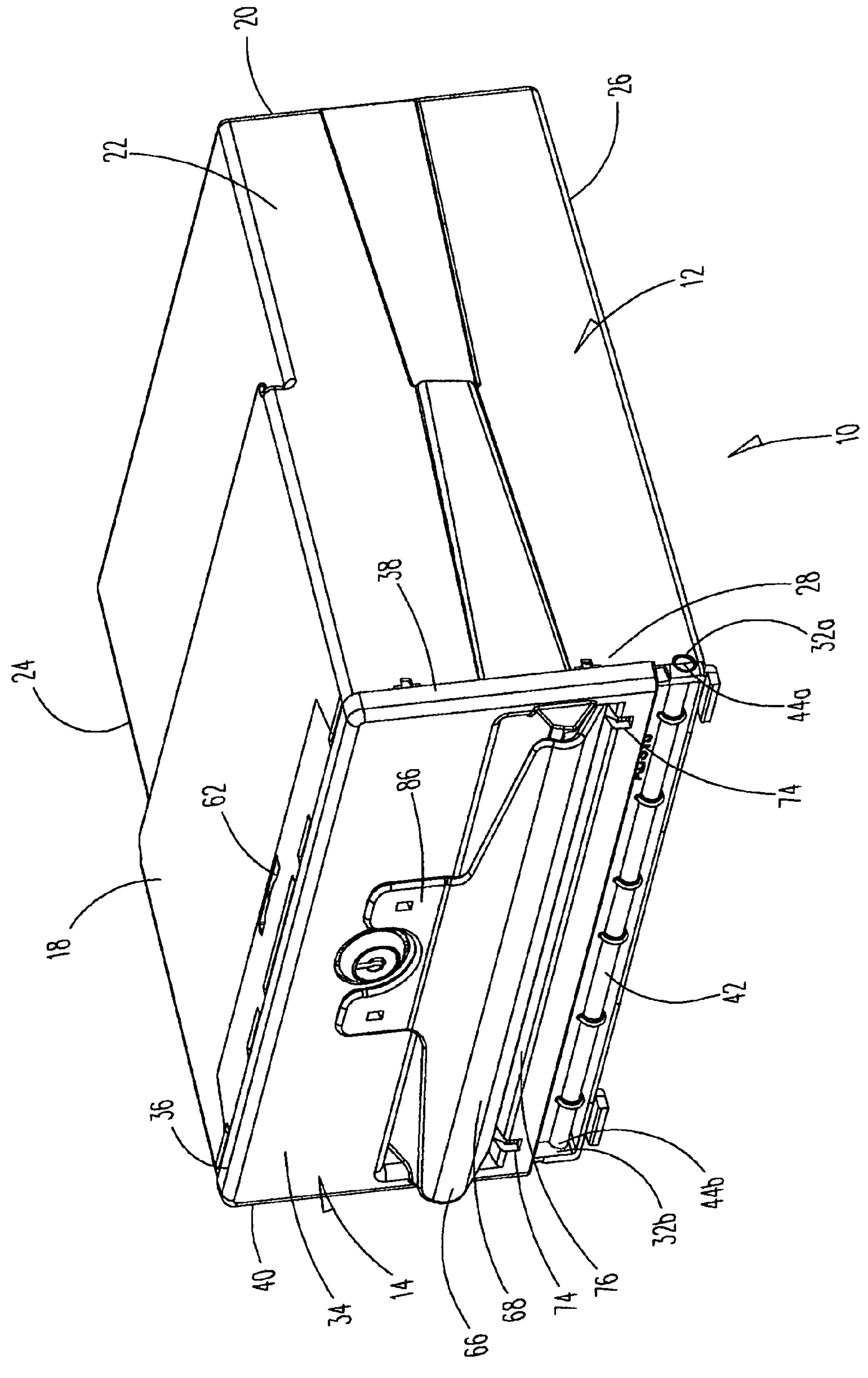
FIG. 1 is a front-side perspective view of a preferred embodiment of a display and dispensing device of the present invention and including a security shield shown in a closed condition.

With reference now to the drawings, a preferred embodiment of a display and dispensing device of the present invention is indicated generally at 10 in FIG. 1. Preferably, the device 10 is utilized for displaying and dispensing lottery-type tickets on the counters of various types of retail establishments, such as convenience stores, that sell such tickets.

The device 10 includes a transparent, box shaped housing 12 and a door 14 that is pivotally attached at its lower end to the housing 12. Forming the housing 12 is a top surface 18, a front wall 20, a pair of opposite sidewalls 22 and 24, a generally flat bottom surface 26 and a rear open end 28 that allows access to the inside of the housing 12 when the door 14 is opened. The housing 12 and the door 14 are preferably molded entirely of a clear plastic material such as polycarbonate. Such materials have inherent flexible and resilient qualities that make their use in forming the device 10 particularly advantageous. Because of these flexible and resilient qualities, the door 14 is pivotally and demountably attachable to the housing 12 as will now be described.

Located in the bottom rear corner of each of the sidewalls 22 and 24 are holes **32*a* and 32*b*. The door 14, has an exterior generally vertical face 34, a horizontal top flange 36 and a pair of vertical side flanges 38 and 40. A bottom portion 42 of the door 14 is generally cylindrical in shape and has a pair of stub shafts 44*a* and 44*b* at opposite ends. The stub shafts 44*a* and 44*b* are designed to be receivably journaled in the holes 32*a*** and 32*b* of the housing sidewalls 22 and 24 respectively. When the door 14 is closed, as best shown in FIGS. 1 and 2, the horizontal top flange 36 and the vertical side flanges 38 and 40 of the door 14 overlap the rear edges of the top surface 18 and sidewalls 22 and 24 respectively and provide a close fit with the housing 12.

Figure 2:
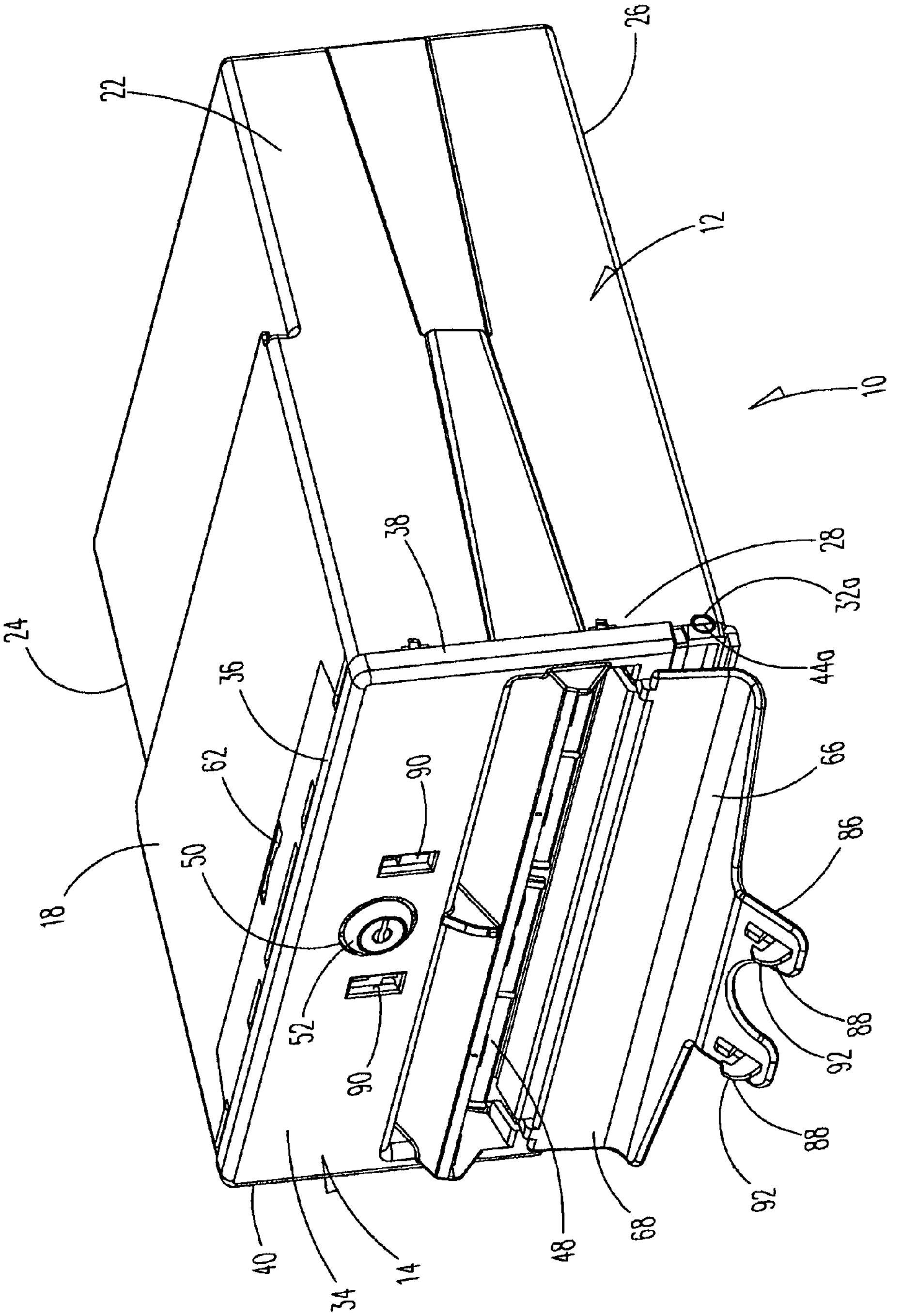
FIG. 2 is a perspective view similar to that of FIG. 1 but showing the security shield in an open condition.

The front door face 34, as indicated in FIG. 2, is formed with a horizontal slot 48 that extends almost the full width of the door 14 and serves as a means for the dispensing of tickets through the door 14 from the interior of the housing 12. Also provided in the front face 34 is an opening shown generally at 50 for installation of a commercially available key actuated cam lock assembly 52. As shown best in FIG. 10, the lock assembly 52 includes a head portion 56, a body portion 58 and a stair step shaped latching arm 60 with a medial portion 62. When the door 14 is closed, the lock assembly 52 can be actuated by a key to cause rotation of the arm 60 so that it engages a slot 62 (see FIGS. 1 and 2) in the housing top wall 18 to secure the top portion of the door 14 to the housing 12.

The above-described structure is generally known by those skilled in the art because display and dispensing devices having somewhat similar type structures are currently in commercial use and have proven to be a highly efficient means for the dispensing of lottery tickets at point of sale locations in retail establishments, particularly convenience stores.

In normal usage, such display and dispensing devices are manually operated to dispense lottery tickets through their dispensing slots. Because of their manual operation, it is important that such dispensing devices are always kept in view of a sales attendant to reduce the risk of theft. This creates a problem for the attendants because occasionally they become engaged in restocking, cleaning or other activities that take them away from a view of the dispensing devices.

The present invention provides the improved display and dispensing device 10 that is adapted to be quickly and effectively secured in a fashion that will prevent the unauthorized removal of lottery tickets therefrom through the use of a security shield 66 with the door 14, as indicated in FIGS. 1 and 2. The security shield 66 is pivotally attached to the door 14 and is movable from an open condition (FIG. 2) in which tickets may be dispensed from the device 10 to a closed condition (FIG. 1) preventing dispensing of tickets therefrom.

Figure 3:
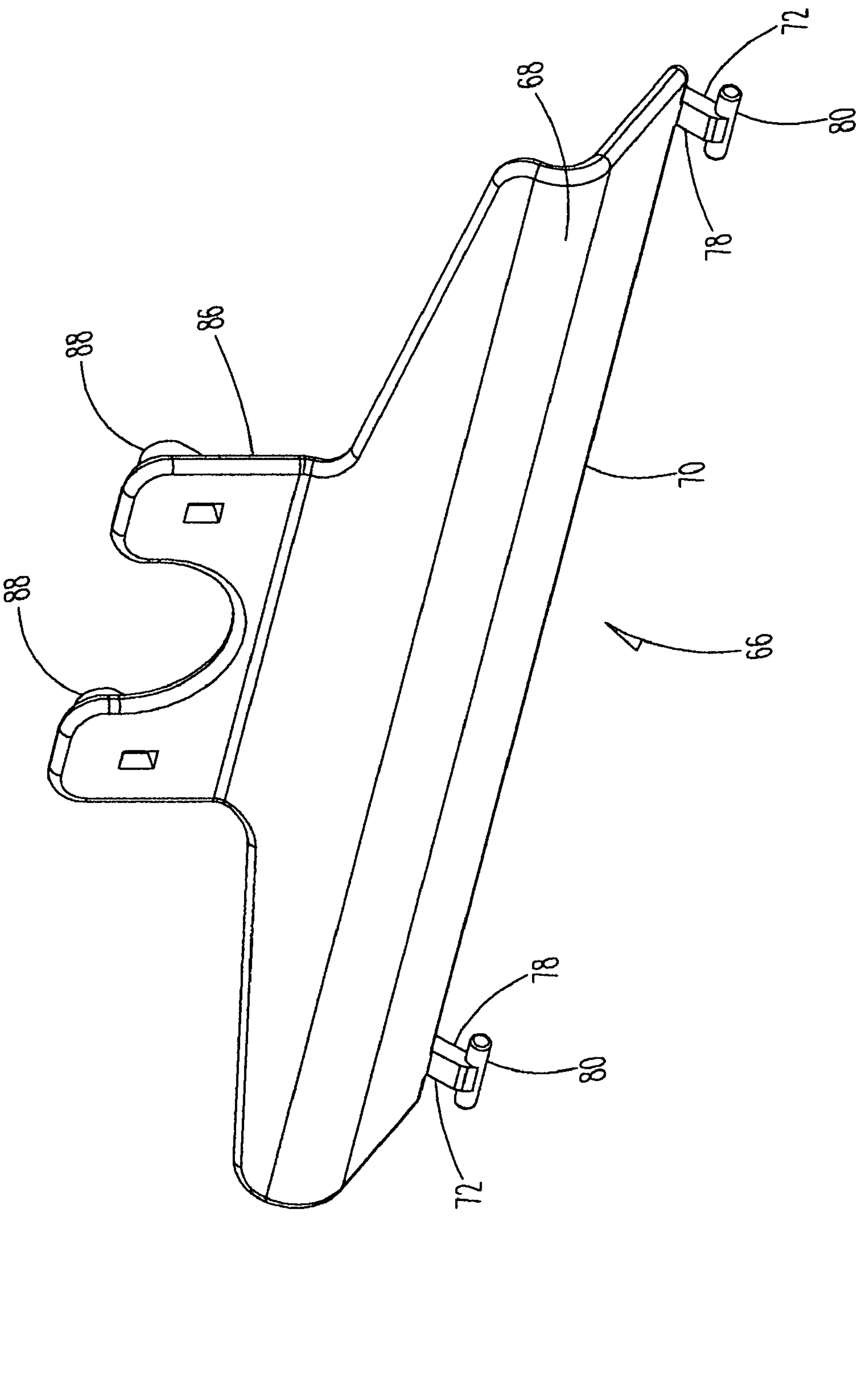
FIG. 3 is a perspective view of the security shield shown in FIG. 1.
Figure 4:
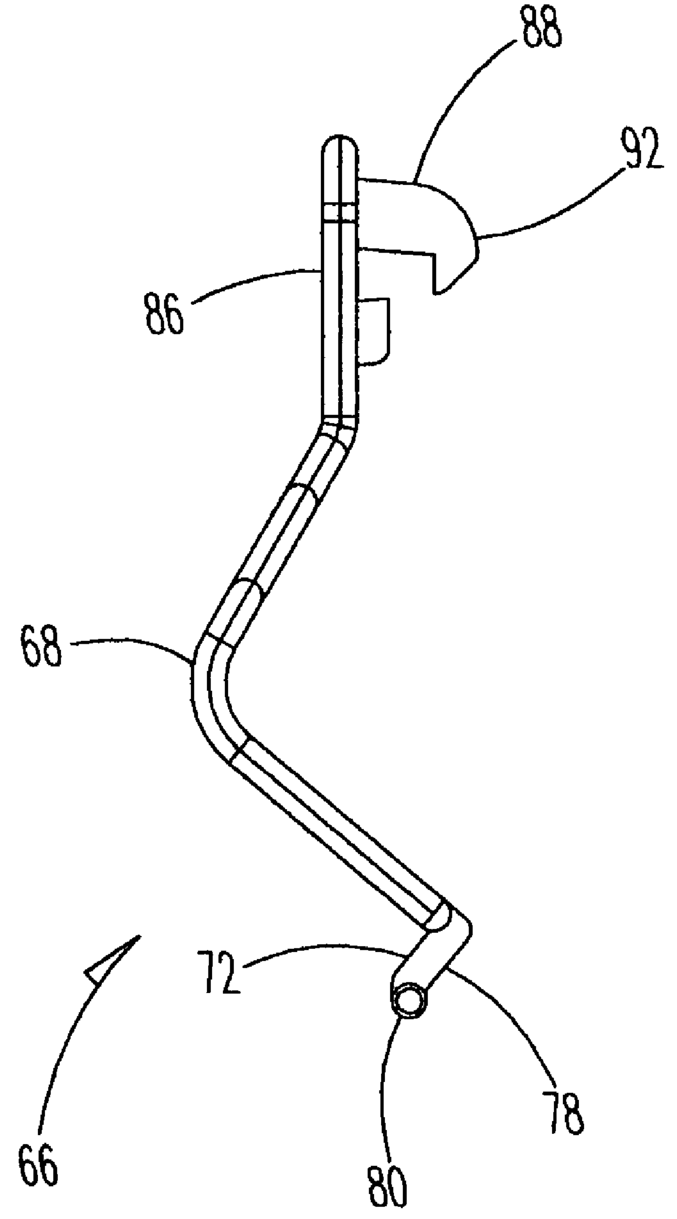
FIG. 4 is an end view of the security shield of FIG. 3.

Referring now to FIGS. 3 and 4, the security shield 66 is formed from a material that is preferably resilient and flexible with an elongated somewhat laterally bow shaped body 68. The body 68 has a lower edge 70 and extending outwardly from opposite ends of the edge 70 are pivot arms 72. The purpose of the arms 72 is to pivotally attach the shield 66 to the door 14 by the positioning of the arms 72 into vertical slits 74 (see FIG. 1) in a lower ledge portion 76 forming the slot 48. The pivot arms 72 are each formed of a short strut 78 that terminates in a horizontal retaining pin 80. The slits 74 are each formed in a "T"-Shape so that the retaining pins 80 of the arms 72 can be inserted therein by passing them through the top cross arm of the "T"-Shaped slit.

Extending upwardly from the medial portion of the shield body 68 is a generally flat head portion 86 that serves as a support for a pair of prongs 88 that are positioned to be directed into rectangularly shaped apertures 90 (see FIG. 2) positioned on opposite sides of the lock assembly 52 in the door 14. The prongs 88 each terminate in a downwardly extending hook portion 92 for a purpose to be described below. Thus, when the shield 66 is placed in a closed condition, the prongs 88 extend through the apertures 90 into the interior of the housing 12.

Figure 5:
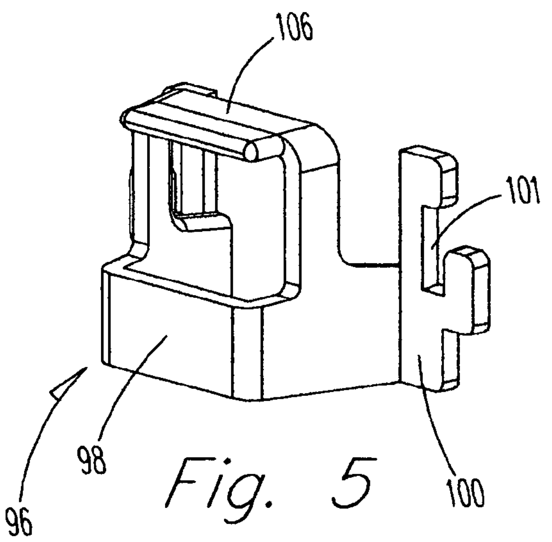
FIG. 5 is a perspective view of a bracket that is included in the device of FIG. 1.
Figure 6:
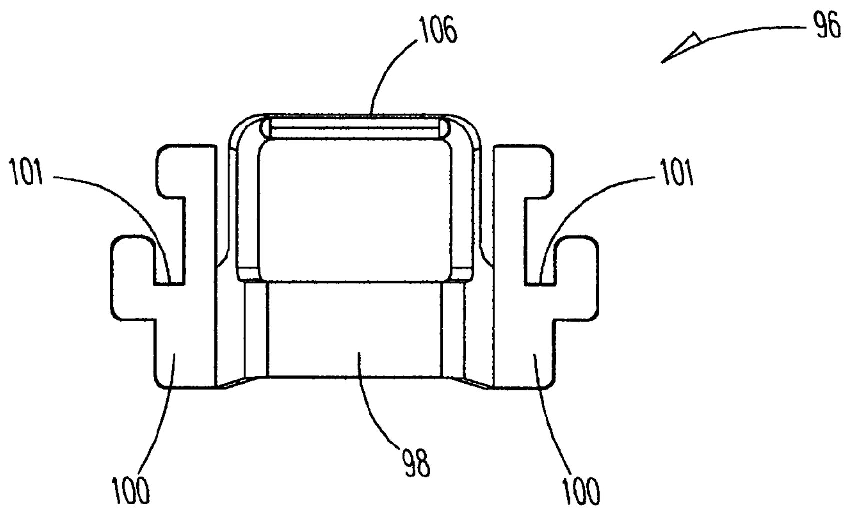
FIG. 6 is a front view in elevation of the bracket of FIG. 5.
Figure 7:
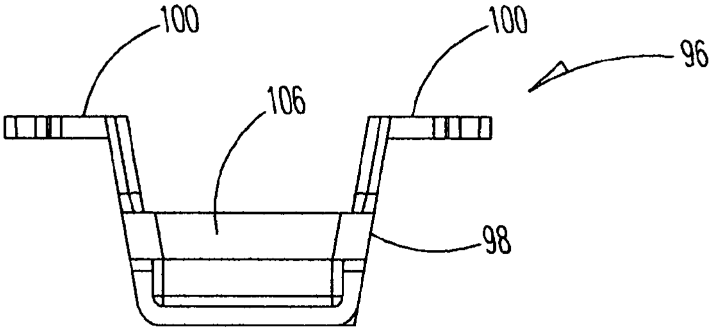
FIG. 7 is a plan view of the bracket of FIG. 5.
Figure 8:
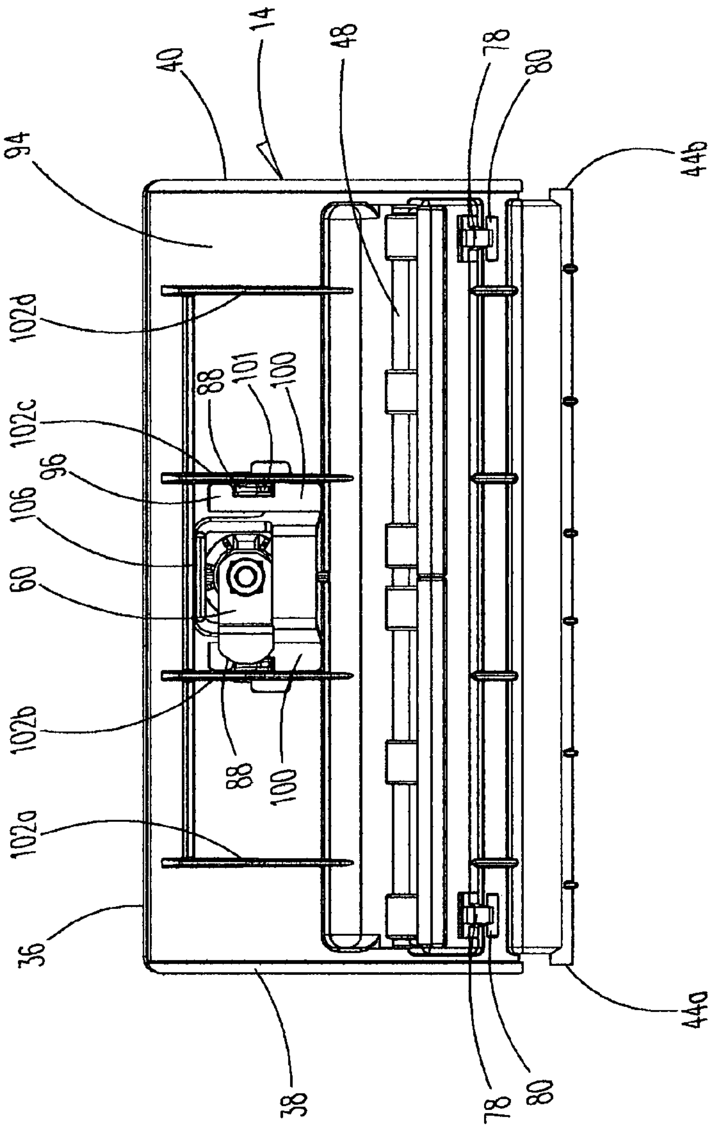
FIG. 8 is a front view of the interior of a door included in the device of FIG. 1.

Referring now to FIG. 8, the inner surface 94 of the door 14 is associated with and provides support for a bracket 96, shown in FIGS. 5-7, that is movable to engage the prongs 88 to lock the shield 66 in a closed position to serve as a securement means for the shield 66. The bracket 96 has a central portion 98 that is generally in a U-shaped configuration and has side slats 100 on each side that project outwardly from the central portion 98 and are notched at 101.

Figure 13:
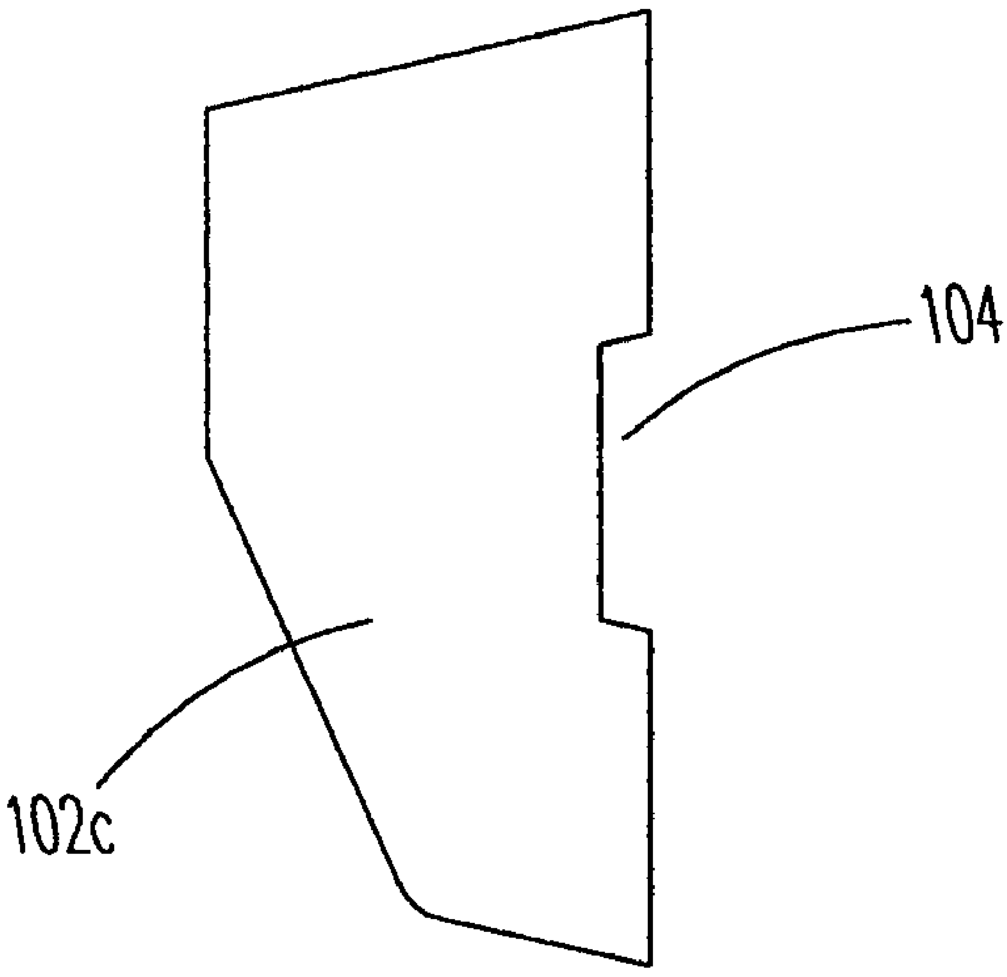
FIG. 13 is a side view in elevation of a reinforcement member for the door.

The inner surface 94 of the door 14 includes four vertically aligned reinforcement members 102*a-d*. As best indicated in FIGS. 10 and 11, the reinforcement members 102*b* and 102*c* have recessed portions 104, as indicated in FIG. 13, for receiving the side slats 100 to hold the bracket 96 on the door 14 in a manner such that the bracket 96 has a limited vertical freedom of movement with respect to the door 14.

Figure 9:
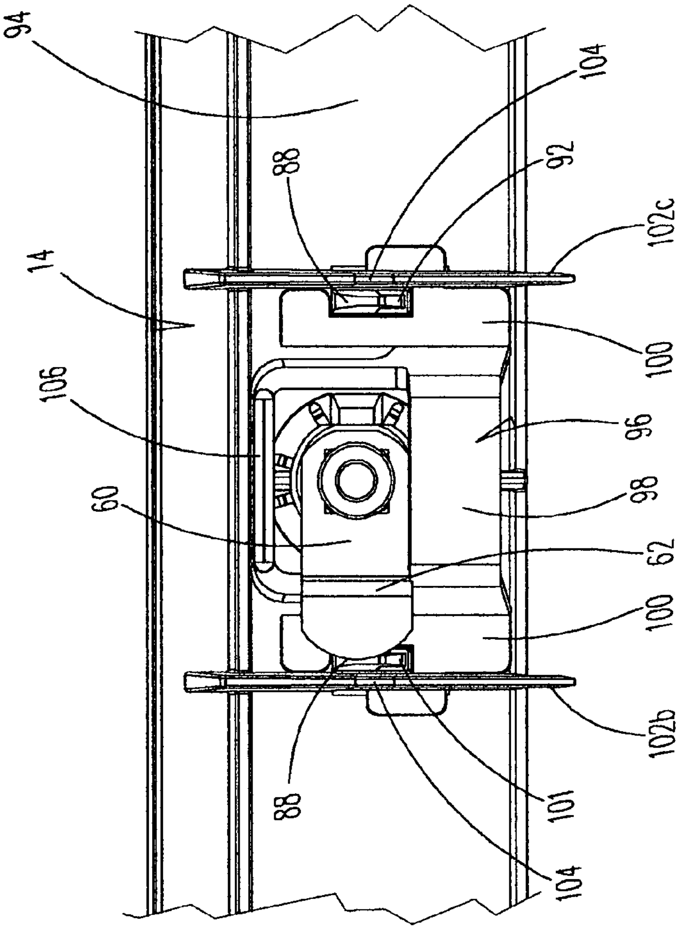
FIG. 9 is an enlarged fragmentary view of a portion of the interior surface shown in FIG. 8.
Figure 10:
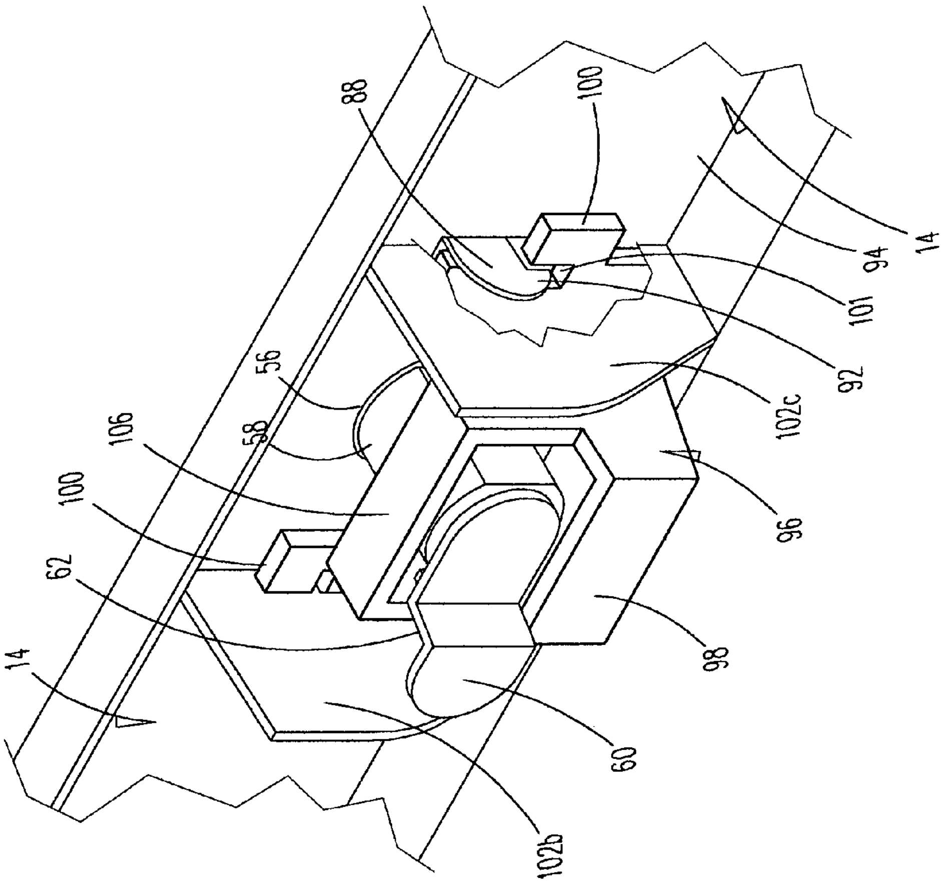
FIG. 10 is an enlarged perspective view of the portion of FIG. 9 showing the bracket of FIG. 5 in association with a lock assembly in an unlocked condition.
Figure 11:
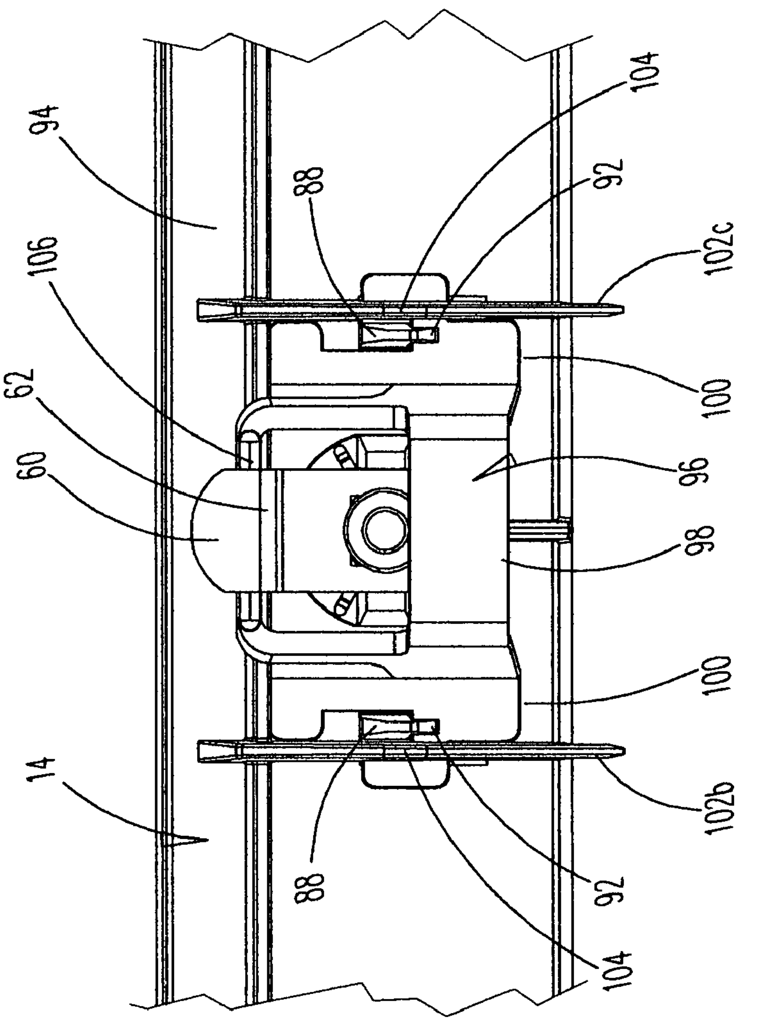
FIG. 11 is a view similar to that of FIG. 9 but with the lock assembly in a locked condition.
Figure 12:
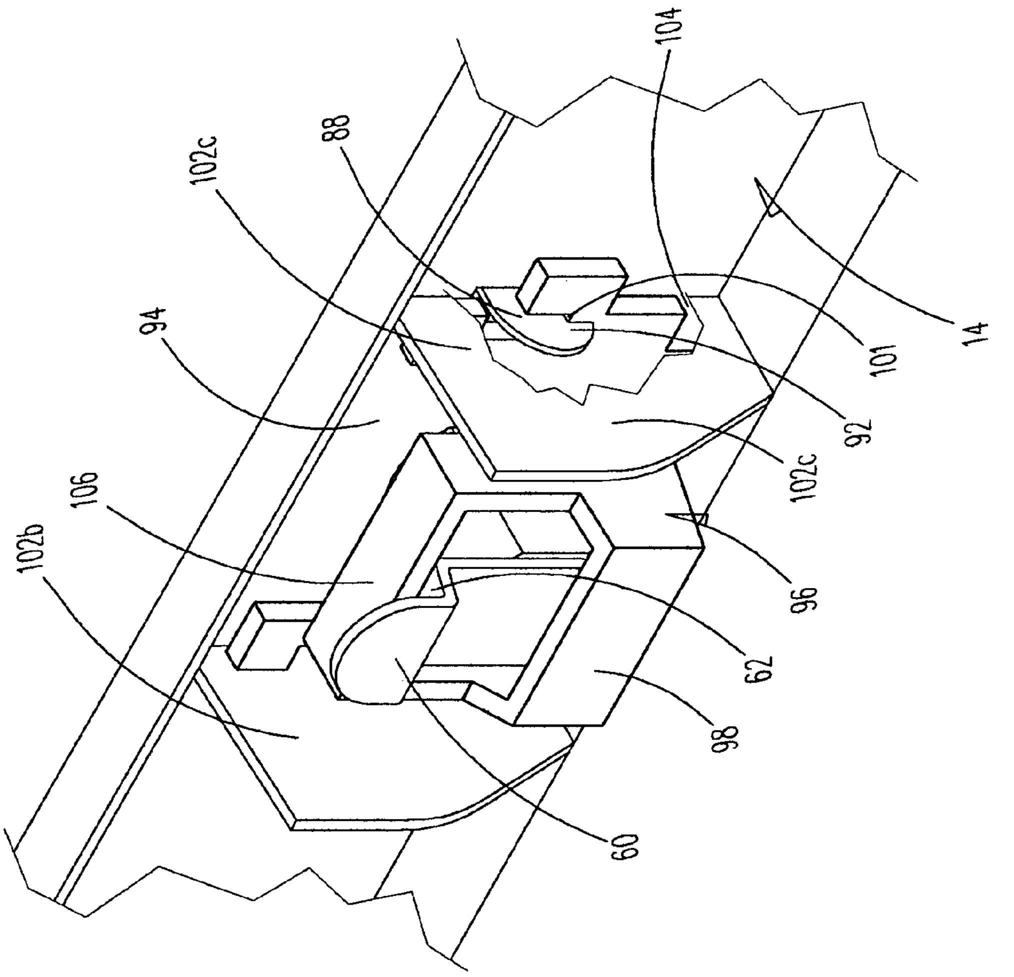
FIG. 12 is an enlarged perspective view similar to that of FIG. 11.

As further indicated in FIGS. 9-12, the bracket 96 generally surrounds the body 58 of the lock assembly 52 so that as the lock assembly 52 is moved from an unlocked condition, shown in FIGS. 9 and 10, into a locked condition, shown in FIGS. 11 and 12, the medial portion 62 of the latching arm 60 engages a bridge portion 106 of the bracket 96 to cause the bracket 96 to move vertically upward. Because of the position of the bracket 96 adjacent the lock assembly 52 and the apertures 90 in the door 14, the bracket side slats 100 move up and down with respect to the bottom portions of the apertures 90.

When the bracket 96 is in its down most position, shown in FIGS. 9 and 10, the apertures 90 are unblocked so that the security shield 66 can be moved from an open condition into a closed condition with the prongs 88 extending through the apertures 90. In this position the ends of the prongs 88 are not in engagement with the side slats 100, as indicated best in FIG. 10. However, when the bracket 96 is moved upward as the lock assembly 52 is moved to a locked condition, the side slats 100 engage the prongs 88 and because of the hook portions 92 of the prongs 88, the security shield 66 is securely held in a closed condition as indicated best in FIG. 12.

It should be noted that the security shield 66 can be moved from an open condition to a closed condition without unlocking the assembly 52. This is because the bracket 96 is formed from a material that has sufficient flexibility to allow the prongs 88 to move over the slats 100 as the shield 66 moves into a closed condition. This action causes the bracket 96 to flex allowing the side slats 100 to move downwardly to permit the prongs 88 to move through the notches 101. Subsequently, the bracket 96 regains its normal shape trapping the shield 66 in a closed condition.

Accordingly, when a sales attendant desires to block the dispensing device 10 from being accessible for the dispensing of tickets, all the attendant has to do is pivot the security shield 66 to position the prongs 88 through the apertures 90 to engage the bracket side slats 100. Simply through these actions, the security shield 66 is placed in a fixed closed condition to block the dispensing slot 48.

Thus, the present invention provides a structure that permits the quick and efficient placement of a lottery ticket dispensing device into a condition that will prevent the dispensing of lottery tickets therefrom. Although the present invention has been described with reference to the preferred embodiment, it should be understood by those skilled in the art that changes can be made in the structure of such embodiment without departing from the true spirit and scope of the invention.

What is claimed is:

1. A display and dispensing device for storing a plurality of tickets that is securable to prevent the dispensing of said tickets when desired, said device comprising:

(a) a housing of box-shaped configuration having a floor, a roof, a pair of sidewalls, a front end and an open rear end;

(b) a door pivotally attached to the rear end of said housing for closing said rear end when shut, said door having a slot for the dispensing of said tickets from said dispenser and an opening near the upper portion of the door;

(c) a lock assembly having a body portion extending through said door opening and a latch member attached to said body portion for engaging a portion of said housing to fix said door in a shut condition when said assembly is locked;

(d) a security shield pivotally attached to said door and being alternatively located in an open condition allowing said tickets to be dispensed through said dispensing slot and a closed condition blocking the dispensing slot to prevent the dispensing of tickets therethrough; and (e) securement means associated with said lock assembly latch member to maintain said security shield in the closed condition when said lock assembly is locked wherein said door includes at least one aperture adjacent said lock assembly body portion and said security shield has a prong that extends through said aperture when said shield is in the closed condition and said securement means engages said prong to secure said shield in the closed position.

2. The device as described in claim 1, wherein said securement means is moved into engagement with said shield prong to secure said shield in the closed condition when said lock assembly is locked.

3. The device as described in claim 2, wherein said securement means is associated with said lock assembly latch member whereby said security means is moved thereby into and out of engagement with said shield prong to alternately secure or release said shield.

4. The device as described in claim 1, wherein said securement means is formed of a bracket that is movably mounted on the interior surface of said door in a position adjacent said lock assembly so that movement of said latch member causes vertical movement of said bracket.

5. The device as described in claim 4, wherein said bracket includes at least one side slat for engaging said security shield when said lock assembly is locked.

6. The device as described in claim 5, wherein said door includes two spaced apart said apertures adjacent the lock assembly body portion and said security shield has two spaced apart said prongs that extend through said apertures when said shield is in the closed condition and said bracket has at least two side slats that engage said prongs to secure said shield in the closed condition.

7. The device as described in claim 6, wherein said prongs each have a hook shaped end to prevent said security shield from being opened when said lock assembly is locked.

8. The device as described in claim 7, wherein said bracket includes a bridge portion extending between said side slats and engageable by said latch member as said lock assembly is locked.

9. The device as described in claim 8, wherein said bracket is formed from a flexible material to allow said security shield to be moved from the open condition to the closed condition while said lock assembly is locked.

10. A display and dispensing device for storing a plurality of tickets that is securable to prevent the dispensing of said tickets when desired, said device comprising:

(a) a housing of box-shaped configuration having a floor, a roof, a pair of sidewalls, a front end and an open rear end;

(b) a door pivotally attached to the rear end of said housing for closing said rear end, said door having a slot for the dispensing of said tickets from said dispenser, an opening near the upper portion of the door and at least one aperture adjacent said opening;

(c) a lock assembly having a body portion extending through said opening and a latch member attached to said body portion for engaging a portion of said housing to fix said door in a shut condition when said assembly is in a locked condition;

(d) a security shield pivotally attached to said door and having at least one prong, said shield being alternatively located in an open condition allowing said tickets to be dispensed through said dispensing slot and a closed condition blocking the dispensing slot to prevent the dispensing of tickets therethrough with said prong extending through said aperture in said door; and (e) securement means associated with said lock assembly latch member to engage said prong and maintain said security shield in the closed condition when said lock assembly is locked.

* * * * *